(12) United States Patent
Peitzmeier et al.

(10) Patent No.: US 7,758,330 B2
(45) Date of Patent: Jul. 20, 2010

(54) METHOD AND APPARATUS FOR FORMING A READY-TO BAKE, ENDLESS DOUGH RING AND METHOD FOR THE MANUFACTURE OF A BAKED RING ARTICLE FROM SUCH A PRE-FORMED DOUGH RING

(75) Inventors: Ulrich Peitzmeier, Verl (DE); Ulrich Gerhardt, Abtsteinach (DE)

(73) Assignee: Neuenkirchener Maschinenfabrik Emil Kemper GmbH, Rietberg (DE)

( * ) Notice: Subject to any disclaimer, the term of this patent is extended or adjusted under 35 U.S.C. 154(b) by 1012 days.

(21) Appl. No.: 11/139,989

(22) Filed: May 31, 2005

(65) Prior Publication Data

US 2006/0040032 A1    Feb. 23, 2006

(30) Foreign Application Priority Data

May 29, 2004   (DE) .................. 10 2004 026 387

(51) Int. Cl.
*A21C 11/02* (2006.01)
*B29C 43/02* (2006.01)

(52) U.S. Cl. .............. 425/287; 425/200; 425/288; 425/290; 425/302.1; 425/364 B; 426/143; 426/499; 426/514; 99/354; 99/386

(58) Field of Classification Search ............... 425/200, 425/202, 204, 206, 209, 233, 235, 236, 237, 425/287–288, 290, 301, 302.1, 305.1, 307, 425/308, 315, 364 B, 364 R, 383, 393, 394, 425/397, 403.1, 412, 335, 411, 238; 426/19, 426/143, 280, 282, 283, 284, 297, 496, 499, 426/504, 512, 514; 99/355, 386, 407, 443 C, 99/443 R, 349, 352, 353, 354
See application file for complete search history.

(56) References Cited

U.S. PATENT DOCUMENTS 2,612,853 A * 10/1952 Bale, Jr. .................. 83/86

(Continued)

FOREIGN PATENT DOCUMENTS

| AT | 3 73 121 | 8/1980 |
|---|---|---|
| CH | 5 43 235 | 12/1973 |
| DE | 23 33 444 A1 | 1/1974 |
| DE | 26 03 210 C2 | 8/1976 |
| DE | 3712372 | 10/1987 |
| DE | 41 20 807 C2 | 1/1993 |
| DE | 44 06 102 C2 | 8/1995 |
| DE | 44 29 973 A1 | 2/1996 |
| DE | 4429973 | 2/1996 |
| DE | 195 48 162 C2 | 7/1997 |
| DE | 196 37 515 C1 | 12/1997 |
| DE | 298 07 993 U1 | 10/1999 |
| DE | 19820055 | 11/1999 |
| DE | 198 20 055 C1 | 12/1999 |
| EP | 1374685 | 1/2004 |

*Primary Examiner*—Steven P Griffin
*Assistant Examiner*—Seyed Masoud Malekzadeh
(74) *Attorney, Agent, or Firm*—Browdy and Neimark, PLLC

(57) ABSTRACT

For forming a ready-to-bake, endless dough ring, a dough piece is first round kneaded in a round-kneading station and then fermented in a fermenting station. In a pressure station, flattening pressure is exerted on two sides of the dough piece for a flat round piece to produce. After a relaxation interval, an inside hole is punched into the relaxed dough piece in a punching station, with a dough ring being obtained. The individual stations of a corresponding dough treatment system are connected to each other by means of a conveyor. Then secondary fermenting of the shaped dough ring takes place, which is followed by baking of a ring article. The result is an efficient method of forming a ready-to-bake, endless dough ring. Producing the baked ring article can be completely automated.

5 Claims, 3 Drawing Sheets

U.S. PATENT DOCUMENTS

| | | | |
|---|---|---|---|
| 2,695,570 A * | 11/1954 | Helland | 425/216 |
| 3,335,678 A | 8/1967 | Katz | |
| 3,517,622 A * | 6/1970 | Schneider et al. | 425/233 |
| 3,599,579 A * | 8/1971 | Paaskesen | 83/107 |
| 3,735,692 A * | 5/1973 | Marchignoni | 99/353 |
| 3,864,071 A * | 2/1975 | La Monica, Luigi | 425/470 |
| 3,882,768 A | 5/1975 | Troisi et al | |
| 3,913,175 A * | 10/1975 | Peterson | 426/513 |
| 4,061,314 A * | 12/1977 | Schmader | 366/145 |
| 4,150,935 A * | 4/1979 | Venzo | 425/305.1 |
| 4,176,589 A * | 12/1979 | Stuck | 99/386 |
| 4,189,994 A * | 2/1980 | Schmader | 99/405 |
| 4,208,441 A * | 6/1980 | Westover | 426/293 |
| 4,218,207 A | 8/1980 | Thompson | |
| 4,303,677 A * | 12/1981 | De Acetis | 426/27 |
| 4,517,447 A * | 5/1985 | Hicks | 219/388 |
| 4,578,273 A * | 3/1986 | Krubert | 426/87 |
| 5,065,670 A * | 11/1991 | Leiweke | 99/405 |
| 5,074,778 A * | 12/1991 | Betts et al. | 425/394 |
| 5,088,912 A * | 2/1992 | Raque et al. | 425/155 |
| 5,417,989 A | 5/1995 | Atwood et al. | |
| 5,458,415 A * | 10/1995 | Poilane | 366/138 |
| 5,591,470 A * | 1/1997 | Bartley | 426/391 |
| 5,593,712 A * | 1/1997 | Poilane | 426/19 |
| 5,641,527 A * | 6/1997 | Burger | 426/94 |
| 5,782,169 A * | 7/1998 | Hicks | 99/355 |
| 5,921,170 A * | 7/1999 | Khatchadourian et al. | 99/349 |
| 5,967,020 A * | 10/1999 | Soyama et al. | 99/327 |
| 6,026,737 A | 2/2000 | D'Alterio et al. | |
| 6,042,864 A | 3/2000 | Bastasch et al. | |
| 6,165,527 A * | 12/2000 | Wilk et al. | 426/279 |
| 6,915,734 B2 * | 7/2005 | Torghele et al. | 99/348 |
| 7,067,167 B2 * | 6/2006 | Damsgard et al. | 426/383 |
| 2001/0032843 A1 * | 10/2001 | Aronsson et al. | 219/730 |
| 2002/0176921 A1 * | 11/2002 | Torghele et al. | 426/549 |
| 2004/0050258 A1 * | 3/2004 | Maniak et al. | 99/353 |

\* cited by examiner

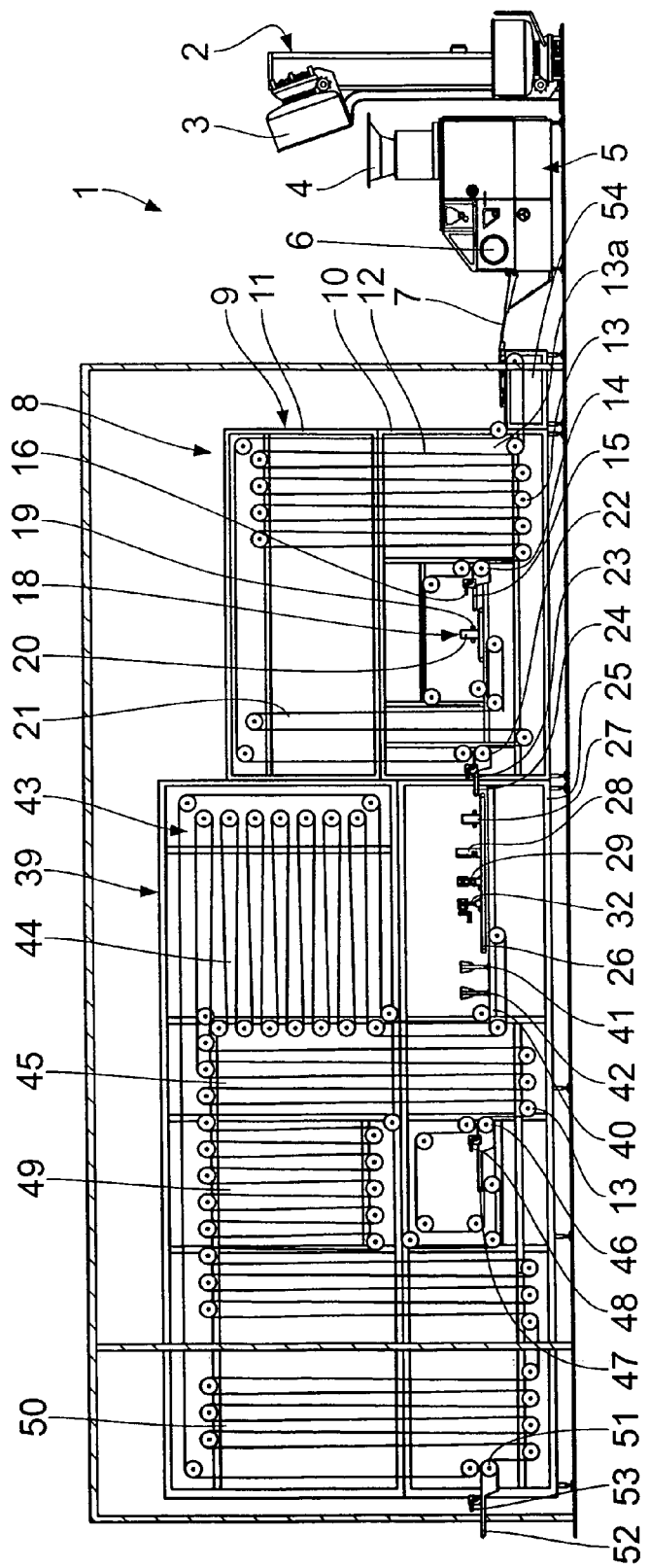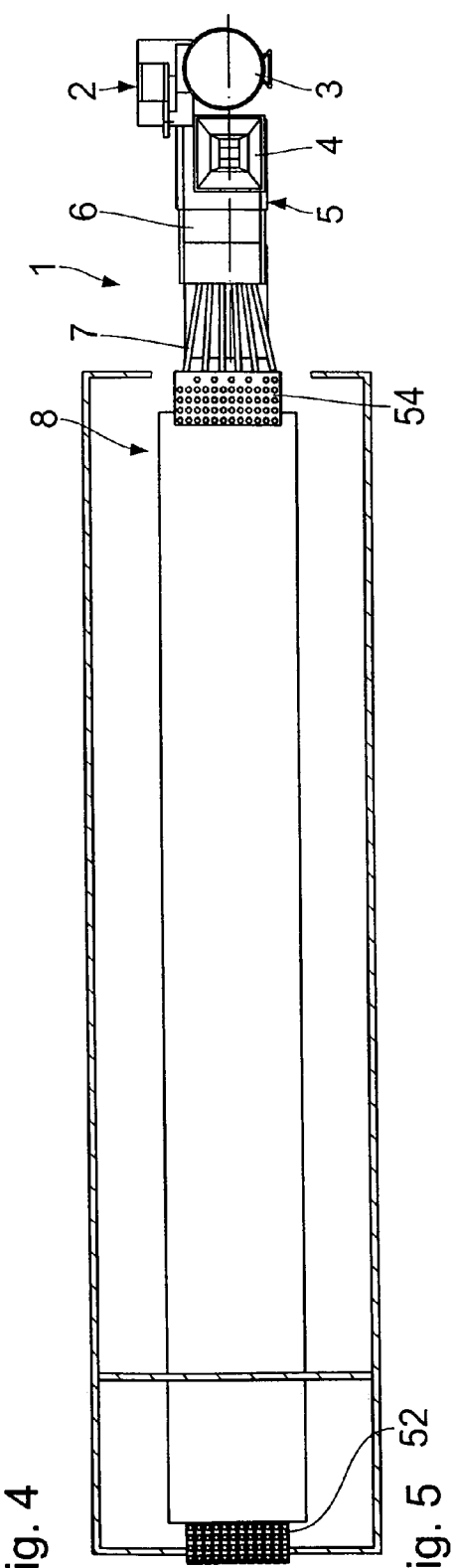

METHOD AND APPARATUS FOR FORMING A READY-TO BAKE, ENDLESS DOUGH RING AND METHOD FOR THE MANUFACTURE OF A BAKED RING ARTICLE FROM SUCH A PRE-FORMED DOUGH RING

BACKGROUND OF THE INVENTION

1. Field of the Invention

The invention relates to a method of forming a ready-to-bake, endless dough ring. The invention further relates to a method of producing a baked ring article from such a pre-formed dough ring and an apparatus for forming a ready-to-bake dough ring.

2. Background Art

A method of the generic type has been known from prior public use in the manufacture of donuts. It starts by a strand of dough being produced, from which the complete donuts are stamped. Even with the articles being stamped out as closely as possible, a considerable rest of dough will remain after the process, which is not used or must be further treated elaborately.

SUMMARY OF THE INVENTION

It is an object of the present invention to specify a more efficient method of forming a ready-to-bake, endless dough ring.

According to the invention, this object is attained in a method comprising the steps of round kneading a dough piece; fermenting the dough piece; exerting flattening pressure on both sides of the dough piece for a round dough piece to form, the extension of which transverse to the direction of pressure exceeding the height thereof in the direction of pressure; allowing the pressed dough piece to relax; punching an inside hole in the relaxed dough piece for a dough ring to be produced.

The method of dough-ring shaping leaves the concept of first producing a strand of dough. Rather, the dough rings are produced from prepared, individual pieces of dough, which means a considerable reduction of any scraps of dough that might remain.

With the steps of exerting pressure and relaxation taking place several times in succession, in particular two or three times in succession, the dough pieces can to be molded gently and carefully.

The relaxation time required in practice after pressure has been exerted can be used simultaneously for fermenting.

Prior to the step of punching, displacement of a central portion of the dough piece outwards takes place such that the thickness of the dough piece, as compared to the rest of the dough piece, is reduced where subsequent punching takes place. This will further reduce any scraps of dough remaining in the production of the dough ring. Instead of punching the inside hole out of the complete piece of dough, the dough is first displaced where the inside hole is going to be located so that only a minimal material thickness has to be punched out, in the most favourable of cases only a thin skin of dough. This also reduces the demands on a punching station.

Dough displacement can be effected by pressure being exercised on the central portion of the dough piece by means of a die, in particular of the type of a stamp, which is a simple way of displacement.

Prior to the job of punching and/or displacement, the dough piece can be centered, with the inside hole and/or the portion of reduced thickness of the dough piece, after punching and/or displacement, being located symmetrically centrally within the piece of dough. This ensures defined positioning of the dough piece prior to the punching and/or displacement job.

Centering may take place by the aid of a defined stop where the dough pieces come to rest prior to the punching and/or displacement job. This way of centering is not complicated.

After being punched out, the central dough portion can be sucked off, which implies prompt and proper removal of the central dough portion that has been punched out.

Another object of the invention resides in specifying a method of further treating the dough piece obtained.

According to the invention, this object is attained by a method of producing a baked ring article from a dough ring, comprising the steps of secondarily fermenting the punched-out dough ring; and baking the secondarily fermented dough ring for obtaining a baked ring article.

Forming as well as further treating the ring of dough can be completely automated according to the invention.

The punched dough ring can be dusted with flour prior to secondary fermenting, resulting in a finished baked ring of optically attractive appearance.

Another object of the invention consists in specifying an apparatus by which to ensure an automated procedure of forming a ready-to-bake, endless dough ring.

According to the invention, this object is attained by an apparatus comprising a round-kneading station; a fermenting station; a pressure station for flattening pressure being exerted on both sides of the dough piece; a punching station; and a conveyor for dough pieces to be transferred between the stations.

The advantages of this apparatus correspond to those mentioned above in connection with the method according to the invention. The individual stations of the apparatus cooperate preferably intermittently, which ensures defined synchronized interaction of the individual method steps.

The apparatus may comprise a centering station located ahead of the punching station and/or displacement station on the path of conveyance, with the centering station providing for a dough piece to be centered prior to punching and/or displacement in such a way that, after the punching and/or displacement job, the inside hole and/or the displaced dough portion will be located symmetrically centrally within the dough piece.

The centering station may comprise a stop on which the dough pieces come to rest prior to punching and/or displacement.

For defined discharge of the punched-out, central dough portion, the punching station can change over, in particular pivot, from a position of punching into a position of discharge. Such a change-over punching station can preferably comprise a plurality of dies, with another die automatically taking the punching position when one of the dies changes from the punching position over into the discharge position. In the position of discharge, the die can for example cooperate with a suction unit for sucking off the punched-out, central dough portion.

The punching station and/or displacement station can be designed for optional connection into the process of treating the dough pieces. As a result of this design, the apparatus may be employed optionally for dough rings or for correspondingly shaped dough pieces that have no inside hole. Consequently, the apparatus can be used simultaneously for producing holed donuts and round donuts. In the production of round donuts i.e., when a ready-to-bake dough piece is produced that has no inside hole, the punching station and/or the displacement station are simply omitted, which, given the mentioned ability of optional connection, can be implemented by the punching station and/or the displacement station being deactivated. By alternative, the conveyor assembly may be embodied in such a way that, optionally, the dough pieces do not pass by the punching station and/or the displacement station. In this way it is possible, by means of the conveyor assembly, to provide for a detour past the punching station and/or the displacement station.

Details of the invention will become apparent from the ensuing description of exemplary embodiments, taken in conjunction with the drawing.

BRIEF DESCRIPTION OF THE DRAWING

FIG. 4 is a view, similar to FIG. 1, of another dough treatment system;
and
FIG. 5 is a plan view of the dough treatment system according to FIG. 4.

DESCRIPTION OF PREFERRED EMBODIMENTS

Figure 1:
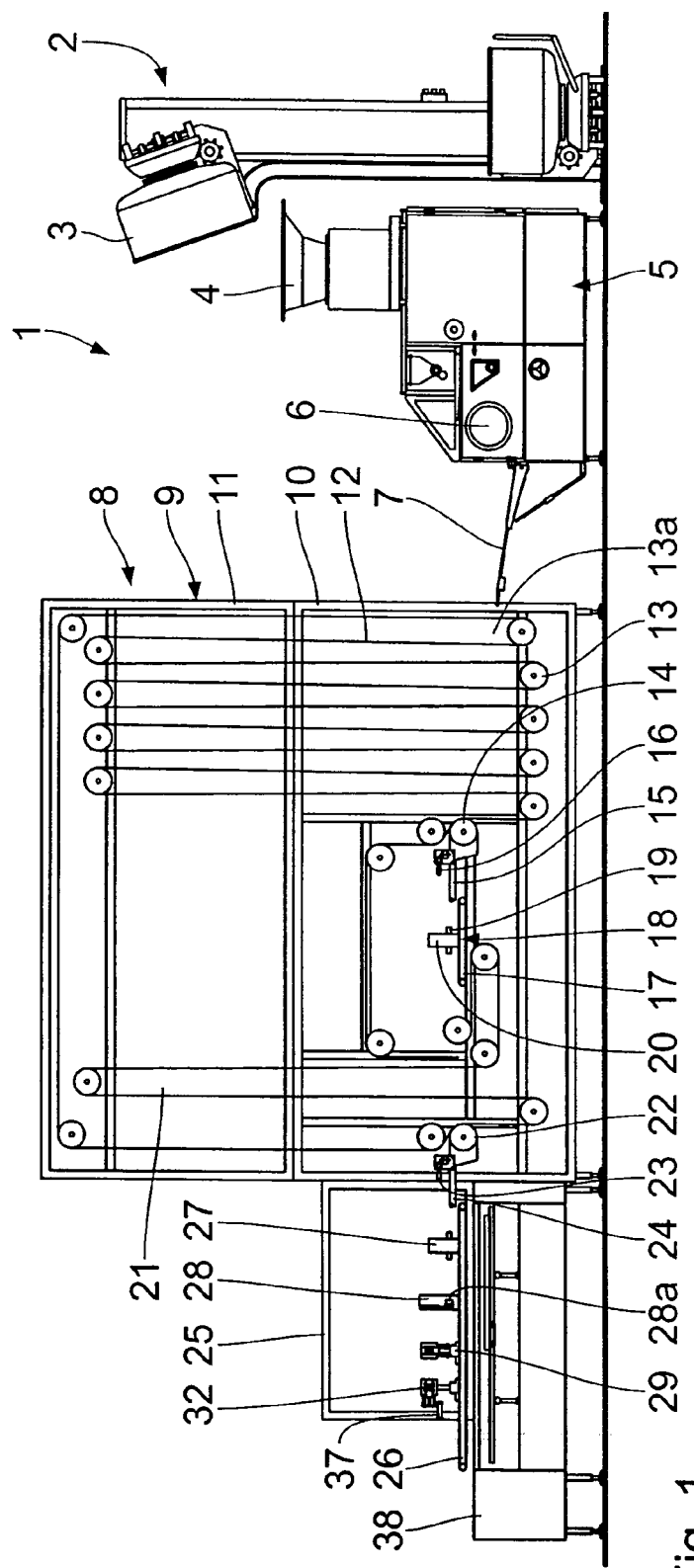
FIG. 1 is a side view of a dough treatment system, showing internal details.
Figure 2:
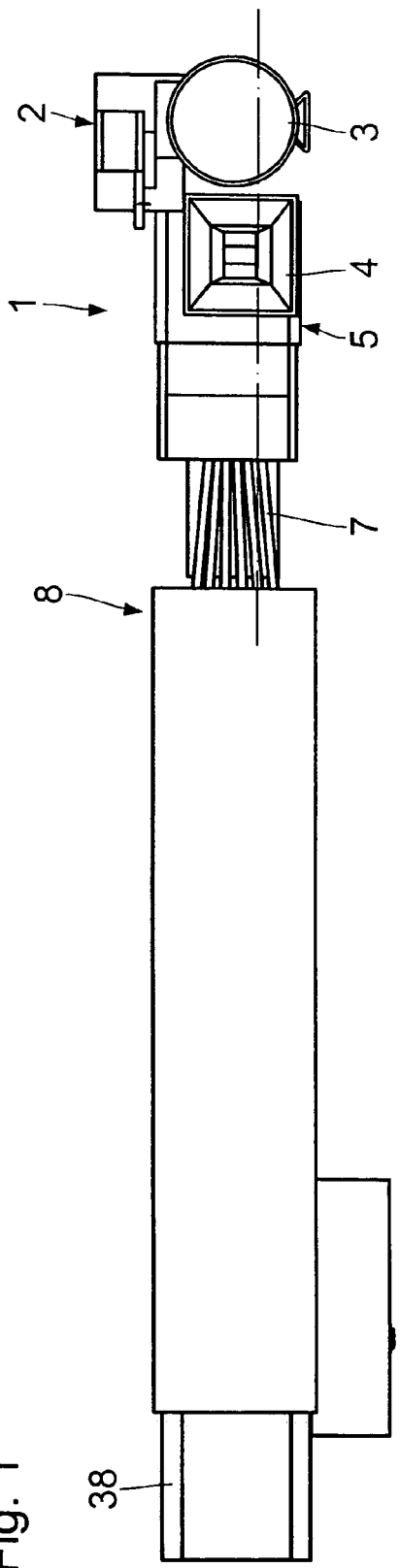
FIG. 2 is a plan view of the system according to FIG. 1.
Figure 3:
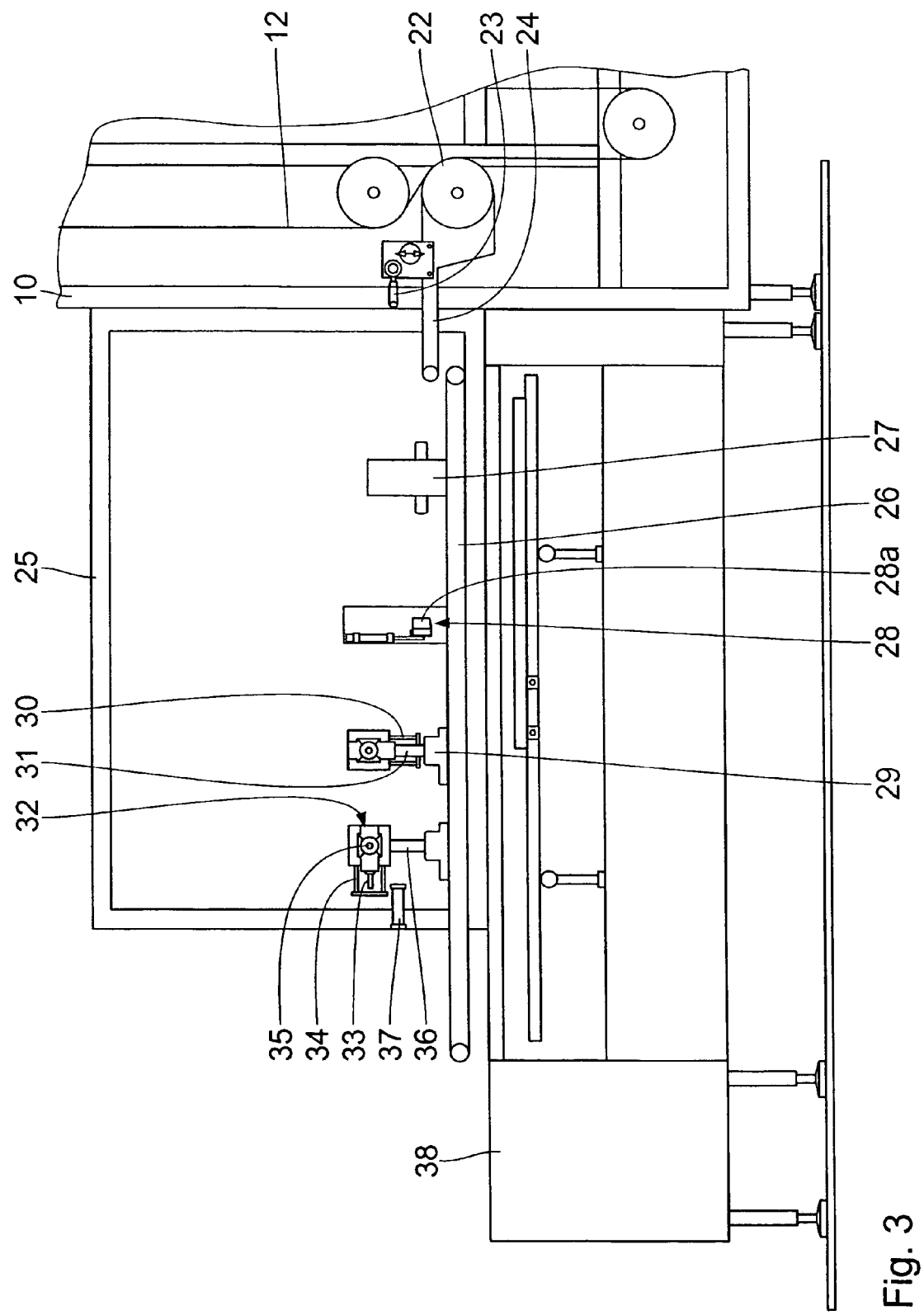
FIG. 3 is a view, on an enlarged scale, of details of FIG. 1 in the vicinity of a part of the system concerned with molding dough pieces.

FIGS. 1 to 3 illustrate a first embodiment of a dough treatment system 1. It comprises a kneader 2 for kneading dough. The kneader 2 comprises a trough 3 which can be lifted and pivoted and which is illustrated in FIG. 1 in a position of kneading as well as in a lifted and pivoted position of discharge. In the position of discharge, a feed hopper 4 is located underneath the trough 3, belonging to a metering and round kneading assembly 5. The metering and round kneading assembly 5 comprises a round kneading station 6 which is connected, via a six-row transfer conveyor belt 7, to a fermenting and molding assembly 8 of modular design. The further treatment stations of the dough treatment system 1 process six rows of dough pieces in parallel.

A hanger conveyor 9 is connected for conveyance to the discharge end of the transfer conveyor belt 7; it is accommodated in two sectional modules 10, 11 of the fermenting and molding assembly 8 which are disposed one on top of the other. The hanger conveyor 9 comprises a plurality of hangers (not shown) for the accommodation of dough pieces. The hangers are joined to a conveyor chain 12 that circulates continuously by way of a plurality of deflection pulleys 13. When conveying, the conveyor chain 12 circulates substantially clockwise inside the sectional modules 10, 11.

Proceeding from the discharge end of the transfer conveyor belt 7, the conveyor chain 12 runs several times up and down in an intermediate fermenting station 13a until reaching a pair 14 of deflection pulleys 13 disposed one directly on top of the other. That is where the hangers are turned over by an entrainer so that the dough pieces contained therein are transferred on to a conveyor belt section 15. A first pressure roller 16 is allocated thereto, pre-forming the dough pieces that pass underneath along the conveyor belt section 15 in such a way that any undefined rolling on the conveyor belt section is precluded.

The dough pieces move from the conveyor belt section 15 on to another conveyor belt section 17 which a pressure station 18 is allocated to. The pressure station 18 comprises a pressure plate 19 which is actuated and movable, guided by a stand 20. Downstream of the pressure station 20, the dough pieces move from the discharge end of the further conveyor belt section 17 on to hangers of the hanger conveyor 9. The operation of the hanger conveyor 9 and the conveyor belt sections 15, 17 is synchronized in such a way that whenever dough-pieces are being discharged by the further conveyor belt section 17, a hanger will be ready at the discharge end of the conveyor belt section 17 for accommodation of the dough pieces.

Downstream of the place of transfer at the discharge end of the conveyor belt section 17, the conveyor chain 12 once again passes up and down along further deflection pulleys 13. As the conveyor chain 12 does so, the hangers run through a second intermediate fermenting station 21. Then the hangers pass another pair 22 of deflection pulleys 13 and another pressure roller 23 with an associated conveyor belt section 24. The conveyor belt section 24 transfers the dough pieces into a molding assembly 25 of the fermenting and molding assembly 8, the molding assembly 25 being lodged in another sectional module of the assembly 8.

FIG. 3 shows the molding assembly 25 in detail. From the conveyor belt section 24, the dough pieces first arrive on another conveyor belt section 26, which is where they pass another pressure station 27 of the same design as the pressure station 18. Then the dough pieces are being transferred from the conveyor belt section 26 towards a centering station 28 where the round dough pieces are being aligned and centered. The centering station 28 possesses a stop 28a for centering the dough pieces. Subsequently, the centered dough pieces are being conveyed from the conveyor belt 26 to a displacement station 29 which comprises an actuated lift-and-descent die (not shown in FIG. 3) in the form of a stamp with a spherical end. A support 30 of the die is mounted on a stand 31 of the displacement station 29. Displacement of a central dough portion outwards takes place in the displacement station 29 by the die pressing on the piece of dough, centrally reducing the thickness as compared to the rest of the dough piece.

Downstream of the displacement station 29, the pre-formed dough piece is being conveyed by the conveyor belt section 26 to a punching station 32. It comprises a punch 33 in the form of an actuated lift-and-descent punching peg. The punch 33 is mounted on a support 34 which, in relation to a stand 36 of the punching station 32, is pivotable about a pivot 35 that is perpendicular to the plane of projection of FIG. 3. The punch 33 and the support 34 are seen in a position of discharge in FIG. 3, with the punch 33 being pivoted about the pivot 35 clockwise by 90° in relation to the position of punching. In the position of punching, the punch 33 is vertical like the die of the displacement station 29 i.e., it is perpendicular to the plane of conveyance given by the conveyor belt section 26. Another conveyor belt section 37 is located under the free end of the punch 33 in the position of discharge. The conveyor belt section 37 serves for collecting and carrying off the punched-out dough portion that is ejected by the punch 33. The punching station 32 may have two punches 33, with one of the two punches 33 taking the position of punching whenever the other one changes from the position of punching over into the position of discharge. For removal of the punched-out dough portion, the punching station 2 may just as well cooperate with a suction unit (not shown) for sucking off the punched-out central dough portion. This way of sucking off can take place by alternative of the ejection of the punched-out dough portion.

Downstream of the punching station 32, the punched-out dough piece is being conveyed by the conveyor belt section 26 for further processing. A depository station 38 is allocated to the discharge end of the conveyor belt section 26; there, the punched-out dough pieces are placed on trays. Then the dough pieces are manually inserted in fermenting chambers for secondary fermenting.

Endless, ready-to-bake dough rings, for example donuts, can be produced by the dough treatment system 1 in the following way: At first, dough is being kneaded in the kneader 2 and automatically fed via the feed hopper 4 into the metering and round kneading assembly 5 where the fed-in dough is metered into individual pieces of dough, with round kneading taking place in the round kneading station 6. Via the transfer conveyor belt 7, the round-kneaded dough pieces are being transferred in six rows to the hangers of the hanger conveyor 9, with intermediate fermenting taking place in the first intermediate fermenting station 13a. The dough pieces are then being turned over and transferred on to the conveyor belt section 15 where they are slightly pressed by the pressure roller 16 so as to prevent undefined rolling. In the pressure station 18, the dough pieces are then more strongly pressed by cooperation of the pressure plate 19 with the conveyor belt section 17, obtaining a flattened, round shape. What is formed is a round piece, the extension of which, transverse to the direction of pressure, exceeding its height along the direction of pressure. Then the pressed dough pieces are again being transferred to the hangers of the hanger conveyor 9, with intermediate fermenting continuing in the second intermediate fermenting station 21. Then the dough pieces are being turned over once again and transferred on to the further conveyor belt section 24 where they are slightly pressed once again by the pressure roller 23 in order to prevent undefined rolling. Then the dough pieces are being pressed more strongly in the pressure station 27, obtaining an even more flattened shape. After being pressed in the pressure stations 18, 27, the dough pieces are allowed to relax. Then the dough pieces, which are rotationally symmetrical about a vertical axis, are being centered in the centering station 28. This takes place by the aid of the stop 28a. After the centering job, the dough pieces arrive in the displacement station 29 where the central dough portion is being displaced by the aid of the die. The dough pieces then arrive in the punching station 32 where the central dough portion, which is but a thin skin after the displacement job, is being punched out by the aid of the punch 33. The displaced dough portion as well as the inside hole formed by punching are located centrally in the dough piece. After the punching job, the punch 33 is being transferred into the position of discharge seen in FIG. 3, passing the punched-out dough portion on to the conveyor belt section 37. The ring of dough produced after the punching job is then being placed on trays in the depository station 38. After secondary fermenting, the dough rings are either being deep frozen or directly baked as donuts.

The dough treatment system 1 works intermittently. In particular, the conveyor belt section 26 conveys intermittently, with the jobs of pressing in the pressure station 27, displacing in the displacement station 29 and punching in the punching station 32 taking place when the dough pieces are at rest. The intermittent conveyance of the conveyor belts 7, 15, 17, 24 and 26 and the conveyance of the hanger conveyor 9 are synchronized.

The dough treatment system 1 according to FIGS. 1 to 3 comprises two pressure stations 18, 27. Alternatively, any other number of pressure stations may be provided.

For the manufacture of round donuts, it is possible to inactivate the displacement station 29 and the punching station 32 and possibly also the pressure stations 18 and 27 so that the dough pieces will pass these stations without being molded. Apart from that, the dough treatment system 1 can be operated as described above in connection with the production of flat donuts. In this way, the dough treatment system 1 can just as well be used for producing round donuts.

The dough treatment system 1 of FIGS. 1 to 3 has an output of 6,000 dough pieces per hour in the case of flat donuts, and an output of approximately 3,000 per hour in the case of round donuts. The intermediate fermenting time in the intermediate fermenting stations 13a and 21 amounts to approximately 20 minutes in the production of flat donuts and approximately 40 minutes in the production of round donuts.

FIGS. 4 and 5 illustrate an alternative dough treatment system. Component parts that correspond to those specified above with reference to FIGS. 1 to 3 have the same reference numerals and are not going to be discussed in detail once again.

In the dough treatment system 1 according to FIGS. 4 and 5, the molding assembly 25 is modularly integrated in a dusting and secondary-fermenting assembly 39 that comprises several sectional modules. In this assembly 39, the dough pieces are being transferred from the conveyor belt section 26 on to another conveyor belt section 40. While being conveyed on the conveyor belt section 40, the dough pieces pass two flour-dusting stations 41, 42 where the pre-formed flat or round donuts are dusted with flour.

From the conveyor belt section 40, the dusted dough pieces are then being transported towards another hanger conveyor 43 which is designed in accordance with the hanger conveyor 9 and in which is accommodated the dusting and secondary-fermenting assembly 39. In case of the hanger conveyor 43 according to FIG. 4, the hangers also circulate substantially clockwise. Proceeding from the discharge end of the conveyor belt section 40, the hangers first arrive in a first secondary fermenting station 44 where the conveyor chain 12 of the hanger conveyor 43 runs substantially to and fro. Then the hangers are being transferred to another secondary fermenting station 45 where the hangers run substantially up and down. Finally, the hangers pass a pair 46 of deflection pulleys, the function of which corresponding to the pairs of deflection pulleys 14 and 22. Consequently, the dough pieces positioned in the hangers are being turned over and transferred on to a conveyor belt section 47 and pressed by means of another pressure roller 48 so that any undefined rolling of the dough pieces on the conveyor belt section 47 is precluded.

From the discharge end of the conveyor belt section 47, the dough pieces are again being transferred to hangers of the hanger conveyor 43. The hanger conveyor 43 and the conveyor belt section 47 are synchronized as explained in connection with the hanger conveyor 9 and the conveyor belts 15 and 17. Proceeding from the discharge end of the conveyor belt section 47, the hangers are being transferred to another secondary-fermenting station 49 above the conveyor belt section 47 where the conveyor chain 12 of the hanger conveyor 43 runs substantially up and down. From there, the hangers reach a secondary-fermenting and cooling station 50 where the dough pieces are cooled for skin formation. The hangers then pass another pair 51 of deflection pulleys and are emptied. The cooled dough pieces are then transferred on to another conveyor belt section 52 which another pressure roller 53 is allocated to, preventing any undefined rolling of the dough pieces on the conveyor belt section 52 by pressing the dough pieces. From the discharge end of the conveyor belt section 52, the cooled dough pieces are then being transferred to a fat-baking oven (not shown).

As compared to the dough treatment system 1 according to FIGS. 1 to 3, the dough treatment system 1 of FIGS. 4 and 5 comprises the further difference of a re-assorting assembly 54 in the form of a discontinuous belt being provided downstream of the transfer conveyor belt 7, re-assorting, into twelve rows, the six rows of round-kneaded dough pieces that arrive downstream of the transfer conveyor belt 7. The dough treatment system 1 of FIGS. 4 and 5 alternatively offers six-row or twelve-row operation. Upon twelve-row operation, the dough treatment system 1 according to FIGS. 4 and 5 has an output of 12,000 dough pieces per hour in flat donut production. In the case of round donuts, an output of 6,000 dough pieces per hour is possible. As compared to the dough treatment system 1 of FIGS. 1 to 3, the intermediate fermenting time remains unchanged. In the dough treatment system 1 of FIGS. 4 and 5, the final fermenting times amount to 35 minutes in the production of flat donuts and 70 minutes in the production of round donuts. The dwell time of the dough pieces in the cooling unit of the secondary-fermenting and cooling station 50 amounts to 5 minutes in the case of flat donuts and 10 minutes in the case of round donuts.

What is claimed is:

1. An apparatus for forming a ready-to-bake, endless dough ring, comprising
    a round-kneading station (6);
    a fermenting station (13*a*, 21; 13*a*, 21, 44, 45, 49, 50);
    a pressure station (18, 27) for flattening pressure being exerted on an upper side and a lower side of a dough piece to be formed;
    a punching station (32) for punching out a central portion of the dough piece;
    a displacement station (29) disposed on a way of conveyance upstream of the punching station (32) for reducing demands on the punching station (32), the displacement station (29) being embodied such that displacement of a central portion of the dough piece outwards takes place prior to punching such that a thickness of the dough piece is reduced as compared to a rest of the dough piece where subsequent punching takes place;
    a conveyor (7, 9, 15, 17, 24, 26; 7, 9, 15, 17, 24, 26, 40, 43, 47, 52) for dough pieces to be transferred between the round-kneading station (6), the fermenting station (13*a*, 21; 13*a*, 21, 44, 45, 49, 50), the pressure station (18, 27), the displacement station (29) and the punching station (32),
    wherein the displacement station (29) comprises a stamp with a spherical end.

2. An apparatus according to claim 1, comprising several pressure stations (18, 27) for flattening pressure to be exerted on the upper side and the lower side of the dough piece, the pressure stations (18, 27) being disposed successively on a way of conveyance of the dough piece such that the dough piece travels through the several pressure stations (18, 27).

3. An apparatus according to claim 2, comprising a fermenting station (21) on the way of conveyance between the pressure stations (18, 27).

4. An apparatus according to claim 2, comprising two pressure stations (18, 27) for flattening pressure to be exerted on the upper side and the lower side of the dough piece, the pressure stations (18, 27) being disposed successively on a way of conveyance of the dough piece such that the dough piece travels through the two pressure stations (18, 27).

5. An apparatus according to claim 2, comprising three pressure stations (18, 27) for flattening pressure to be exerted on the upper side and the lower side of the dough piece, the pressure stations (18, 27) being disposed successively on a way of conveyance of the dough piece such that the dough piece travels through the three pressure stations (18, 27).

* * * * *